Oct. 10, 1967      D. S. CUSHING      3,346,000
ANTI-SIPHON DEVICE FOR AN AUTOMATIC WASHER
Filed Sept. 26, 1963
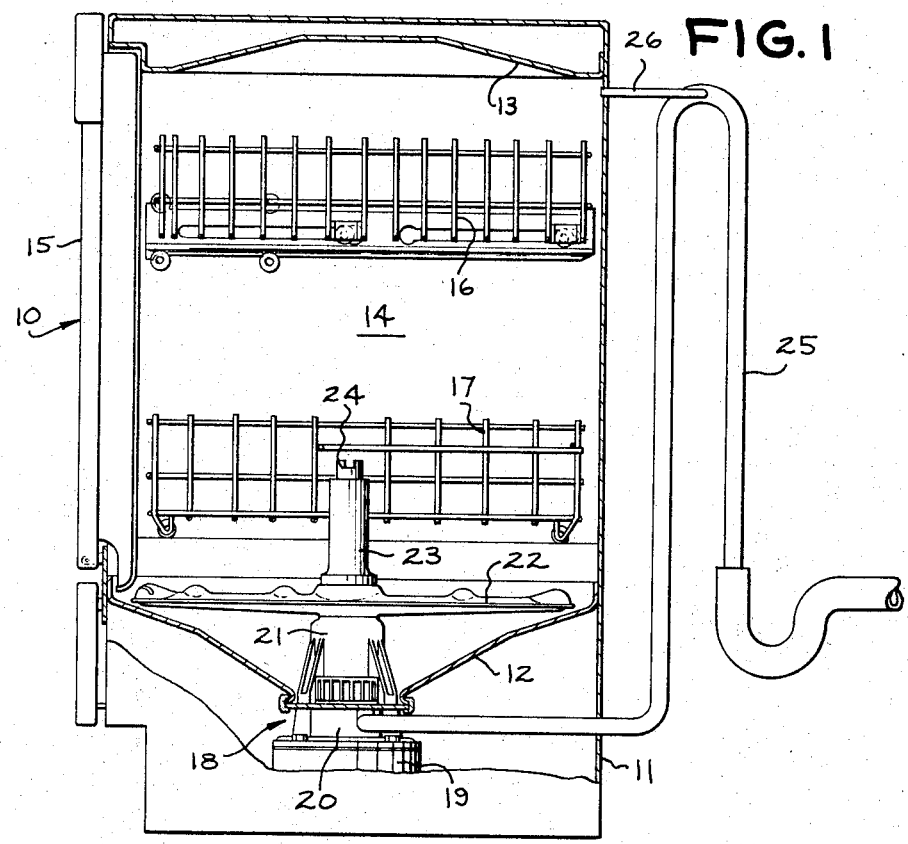
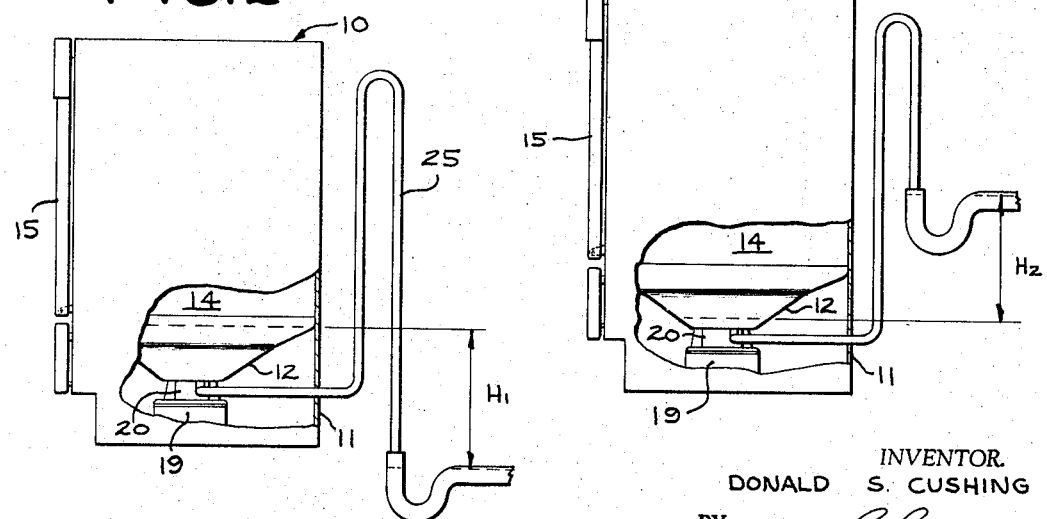
INVENTOR.
DONALD S. CUSHING
BY James E. Espe
HIS ATTORNEY – # United States Patent Office 3,346,000
Patented Oct. 10, 1967

3,346,000
ANTI-SIPHON DEVICE FOR AN AUTOMATIC WASHER
Donald S. Cushing, Louisville, Ky., assignor to General Electric Company, a corporation of New York
Filed Sept. 26, 1963, Ser. No. 311,837
3 Claims. (Cl. 137—216)

This invention relates generally to automatic washers such as, for example, an automatic dishwasher and, more particularly, to a device for preventing siphoning through the discharge conduit of the washer.

Many plumbing codes require, and even in the absence of such codes it is desirable, that the effluent discharge conduit from an automatic washing machine be provided with an anti-siphon device to prevent the siphoning of vitiated fluids from the sewer system back into the washer. In addition, it is desirable to have a device which will prevent the siphoning of washing fluids from the washer into the sewer system since this would obviously intefere with proper operation of the washer.

Various types of such anti-siphon devices have been provided in the past; however, many of these have had accompanying disadvantages. For example, check valves have been employed in the discharge conduit and were arranged to allow fluids to flow in one direction only, from the washer to the sewer system. The check valve arrangement, though to some extent quite practical, has two obvious disadvantages. In the first place it is expensive to manufacture and secondly it is subject to clogging and fouling by small particles of foreign matter. Additionally, the check valve affords no protection against siphoning of fluids from the washer into the sewer system. Another example of an anti-siphon device is the air gap vent arrangement which comprises a gap in the discharge conduit with the gap vented to the atmosphere. The arrangement sufficiently prevents siphoning of fluids through the conduit from the washer into the sewer system and from the sewer system into the washer; however, it presents a problem in that if the conduit downstream from the air gap becomes partially obstructed, fluids being pumped from the washer will back up and overflow through the vent. Since the vent quite often, especially in an automatic dishwasher, is in the vicinity of the kitchen counter this results in vitiated washing fluids being flooded onto the kitchen counter. Therefore, it would be desirable to have a device which will effectively prevent siphoning of fluids into or out of an automatic washer, through the discharge conduit, which is inexpensive to manufacture, and which is not subject to overflowing in the event of partial obstruction of the discharged conduit downstream from the device.

Accordingly, it is an object of this invention to provide an improved anti-siphon device for an automatic washer.

It is another object of this invention to provide an anti-siphon device for an automatic washer which will effectively prevent siphoning of fluids into or out of the washer through the discharge conduit.

It is a further object of this invention to provide such an anti-siphon device which is not subject to overflowing even though the discharge conduit downstream from the device may become partially obstructed.

Briefly stated, in accordance with one aspect of the invention, there is provided in an automatic washing machine an anti-siphon device comprising a vent conduit interconnecting the discharge conduit and the wash chamber of the washing machine. With this arrangement, the air in the wash chamber will serve to break any siphon which may tend to develop in the discharge conduit. Additionally, in the event that the discharge conduit should become obstructed from foreign material downstream from the anti-siphon device, fluids being pumped from the washer will be returned to the wash chamber rather than overflowing into the area adjacent the device.

While the specification concludes with claims particularly pointing out and distinctly claiming the subject matter which is regarded as the invention, it is believed that the invention will be better understood from the following description taken in connection with the accompanying drawings, in which:

FIGURE 1 is a sectional view of an automatic dishwasher in which the present invention has been incorporated;

FIGURE 2 is a schematic illustration of a discharge connection for a dishwasher wherein fluids could be siphoned out of the machine in the absence of the present invention; and FIGURE 3 is an illustration of a dishwasher discharge connection wherein fluids could be siphoned from the sewer system into the dishwasher.

Referring now to the drawings, and particularly to FIGURE 1, there is illustrated an automatic dishwasher 10. Although an automatic dishwasher has been illustrated for the purpose of describing the present invention, it should be realized that the present invention is not necessarily limited to an automatic dishwasher. The present invention is equally applicable to any appliance having a fluid-containing chamber interconnected by a discharge conduit to a sewer system. Accordingly, the present invention would be readily adaptable for use in a clothes washing machine. Dishwasher 10 includes an outer cabinet 11 which, in cooperation with bottom wall 12 and top wall 13, defines a wash chamber 14. A closure member 15 provides access to the wash chamber 14 so that articles to be washed therein can be loaded onto racks 16 and 17.

A motor pump assembly 18 is supported by bottom wall 12 and includes a drive motor 19, a discharge pump 20 and a wash pump 21. Positioned atop the wash pump 21 is a reaction-type spray arm 22 and a cylindrical extensible spray device 23. Element 24 of spray device 23 rises longitudinally under the influence of water pressure generated by wash pump 21, to a position below rack 16 thereby to provide a washing spray action immediately below rack 16. Also, spray arm 22 rotates under the influence of water pressure generated by wash pump 21 to provide thorough washing action for the articles contained by rack 17.

The motor pump assembly 18 is of the type wherein, upon rotation of motor 19 in one direction, wash pump 21 operates to create a wash action within chamber 14 by means of spray arm 22 and spray device 23 while, upon rotation of drive motor 19 in the opposite direction, discharge pump 20 operates to withdraw the washing fluids from chamber 14 out through discharge conduit 25 to a conventional sewer system (not shown).

Referring to FIGURES 2 and 3, there are illustrated structural installations of dishwasher 10 wherein the aforementioned siphoning problem would exist. In FIGURE 2, it can be seen that discharge conduit 25, after making an inverted U bend, extends well below the bottom wall 12 of dishwasher 10. As a result, a water head $H_1$ is created such that, if discharge conduit 25 is filled with fluid, the fluid in the wash chamber 14 will tend to be siphoned therefrom into the sewer system. In FIGURE 3, an illustration of a structural installation of dishwasher 10 is shown wherein discharge conduit 25, after making an inverted U-bend, terminates at a point well above the water level in wash chamber 14 after the wash chamber has been drained. With this arrangement, when discharge conduit 25 is filled with fluid, there will be a tendency to siphon water from the sewer system into wash chamber 14 due to the water head $H_2$.

As mentioned above, means have been suggested in the past for overcoming the siphoning problems illustrated in FIGURES 2 and 3. For example, a check valve (not shown, could be installed in discharge conduit 25 of FIGURE 3 to prevent siphoning of fluids from the sewer system into wash chamber 14 since the check valve would allow fluids to pass only in the direction from the washing chamber to the sewer system; however, if such a check valve were provided and it later developed that the structural installation of dishwater 10 was as shown in FIGURE 2, the check valve would be ineffective in preventing siphoning of fluids from wash chamber 14 into the sewer system since the check valve would allow fluids to pass in that direction. Another means to solve the siphoning problem, also mentioned above, is the installation in discharge conduit 25 of an open air gap which will prevent siphoning in either direction since it will allow the draining of any fluids in conduit 25. However, the open air gap presents an ancillary problem in the nature of flooding or overflowing during draining of wash chamber 14 if the discharge conduit 25 should become obstructed or restricted between the open air gap and the sewer system.

In accordance with the present invention, there is provided a vent conduit 26 which interconnects discharge conduit 25 at or near the upper extremity of its inverted U bend to the wash chamber 14. Since wash chamber 14 is essentially at atmospheric pressure and contains a sufficient quantity of air, vent conduit 26 will allow both legs of discharge conduit 25 to drain upon discontinuation of operation of discharge pump 20. This draining of both legs of discharge conduit 25 obviously prevents any siphon from occurring either into or out of wash chamber 14. The arrangement shown in FIGURE 1, with the vent conduit interconnecting discharge conduit 25 and wash chamber 14, also overcomes the aforementioned problem which arises when a simple air gap anti-siphon device is employed. In other words, should the discharge conduit 25 become obstructed downstream from vent conduit 26 there will be no flooding or overflowing of fluids being pumped by discharge pump 20. Rather, the fluids will be returned to wash chamber 14 through the vent conduit 26.

It should be realized, that when discharge pump 20 is operating and fluids are being pumped through the discharge conduit 25 a small amount of water will be pumped back into wash chamber 14 through vent conduit 26. For this reason, the cross-sectional area of vent conduit 26 should be kept relatively small in comparison with the cross-sectional area of discharge conduit 25 so that the vast majority of fluid being pumped will continue on through discharge conduit 25 to the sewer system.

As will be evident from the foregoing description, certain aspects of the invention are not limited to the particular details of construction of the example illustrated, and it is contemplated that various and other modifications or applications will occur to those skilled in the art.

It is therefore intended that the appended claims shall cover such modifications and applications as do not depart from the true spirit and scope of the invention.

What I claim as new and desire to secure by Letters Patent of the United States is:
1. A washing machine comprising:
 (a) a wash chamber adapted to receive and contain articles to be washed therein,
 (b) means disposed adjacent the bottom of said wash chamber to discharge fluid from said wash chamber,
 (c) an unrestricted constantly-open valveless imperforate discharge conduit to conduct the fluid from said means,
 (d) said discharge conduit having an inverted U bend therein adjacent the top of said wash chamber with each leg of the U extending downwardly substantially to the level of said means,
 (e) a vent conduit extending from said wash chamber to said discharge conduit near the upper extremity of said inverted U bend to prevent siphoning of fluids through said discharge conduit.
2. An automatic dishwasher comprising:
 (a) a wash chamber adapted to receive and contain dishes to be washed therein,
 (b) a pump disposed adjacent the bottom of said wash chamber to discharge vitiated washing fluid from said wash chamber,
 (c) an unrestricted constantly-open valveless imperforate discharge conduit connected at one end to said pump and adapted to be connected at its other end to a conventional sewer system,
 (d) said discharge conduit having an inverted U bend therein adjacent the top of said wash chamber with the end of said conduit adapted to be connected to the sewer system disposed at substantially the same level as the end connected to said pump,
 (e) a vent conduit extending from said wash chamber to said discharge conduit near the upper extremity of said inverted U bend to prevent siphoning of fluids through said discharge conduit.
3. The invention as defined in claim 2 wherein said vent conduit has a cross-sectional area less than the cross-sectional area of said discharge conduit.

References Cited

UNITED STATES PATENTS

| | | | |
|---|---|---|---|
| 2,062,516 | 12/1936 | Jones | 137—216 |
| 2,654,386 | 10/1953 | Wotring | 137—215 |
| 2,825,348 | 3/1958 | Low | 134—186 X |
| 3,064,666 | 11/1962 | Weiss et al. | 134—186 X |

FOREIGN PATENTS 1,069,015  10/1952  France.

WILLIAM F. O'DEA, *Primary Examiner.*

D. LAMBERT, *Assistant Examiner.*